US009650281B2

(12) United States Patent
Bookbinder et al.

(10) Patent No.: US 9,650,281 B2
(45) Date of Patent: *May 16, 2017

(54) OPTICAL FIBER WITH REDUCING HYDROGEN SENSITIVITY

(71) Applicant: Corning Incorporated, Corning, NY (US)

(72) Inventors: Dana Craig Bookbinder, Corning, NY (US); Robert Brett Desorcie, Painted Post, NY (US); Hazel Benton Matthews, III, Wilmington, NC (US); Pushkar Tandon, Painted Post, NY (US)

(73) Assignee: Corning Incorporated, Corning, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/734,104

(22) Filed: Jun. 9, 2015

(65) Prior Publication Data

US 2016/0009588 A1    Jan. 14, 2016

Related U.S. Application Data

(60) Provisional application No. 62/022,305, filed on Jul. 9, 2014.

(51) Int. Cl.
  *G02B 6/02* (2006.01)
  *C03B 37/027* (2006.01)
  (Continued)

(52) U.S. Cl.
  CPC .. *C03B 37/01205* (2013.01); *C03B 37/01446* (2013.01); *C03B 37/027* (2013.01);
  (Continued)

(58) Field of Classification Search
  CPC ........ C03B 37/01205; C03B 37/01446; C03B 37/027; C03B 3/06; C03B 13/045;
  (Continued)

(56) References Cited

U.S. PATENT DOCUMENTS 4,515,612 A    5/1985 Burrus, Jr. et al.
4,623,373 A    11/1986 Stone
(Continued)

FOREIGN PATENT DOCUMENTS

EP    2175295    4/2010
JP    1988295358    12/1988
(Continued)

OTHER PUBLICATIONS

Patent Abstract of Japanese Publication #63-295358; Publication date: Dec. 1, 1988; Kazushige et al.
(Continued)

*Primary Examiner* — John M Bedtelyon
(74) *Attorney, Agent, or Firm* — Kevin L. Bray

(57) ABSTRACT

The present disclosure is directed to a method of making an optical fiber with improved bend performance, the optical fiber having a core and at least one cladding layer, and a chlorine content in the in the last layer of the at least one cladding layer that is greater than 500 ppm by weight. The fiber is prepared using a mixture of a carrier gas, a gaseous chlorine source material and a gaseous reducing agent during the sintering of the last or outermost layer of the at least one cladding layer. The inclusion of the reducing gas into a mixture of the carrier gas and gaseous chlorine material reduces oxygen-rich defects that results in at least a 20% reduction in TTP during hydrogen aging testing.

40 Claims, 6 Drawing Sheets

(51) Int. Cl.
*C03B 37/012* (2006.01)
*C03B 37/014* (2006.01)
*C03C 3/06* (2006.01)
*C03C 13/04* (2006.01)

(52) U.S. Cl.
CPC .............. *C03C 3/06* (2013.01); *C03C 13/045* (2013.01); *G02B 6/02* (2013.01); *G02B 6/021* (2013.01); *C03B 37/0146* (2013.01); *C03B 2201/10* (2013.01); *C03B 2201/12* (2013.01); *C03B 2201/20* (2013.01); *C03B 2201/22* (2013.01); *C03B 2201/31* (2013.01); *C03B 2201/32* (2013.01); *C03B 2201/34* (2013.01); *C03B 2201/42* (2013.01); *C03B 2203/23* (2013.01); *C03B 2203/24* (2013.01); *C03C 2201/11* (2013.01); *C03C 2201/22* (2013.01); *C03C 2201/31* (2013.01); *C03C 2203/54* (2013.01); *Y02P 40/57* (2015.11)

(58) Field of Classification Search
CPC ............ C03B 37/0146; C03B 2201/10; C03B 2201/12; C03B 2201/20; C03B 2201/22; C03B 2201/31; C03B 2201/32; C03B 2203/23; C03B 2203/24; C03B 2201/34; C03B 2201/42; G02B 6/02; G02B 6/021; Y02P 40/57; C03C 2201/11; C03C 2201/22; C03C 2201/31; C03C 2201/54
See application file for complete search history.

(56) References Cited

U.S. PATENT DOCUMENTS

| | | |
|---|---|---|
| 4,641,917 A | 2/1987 | Glodis et al. |
| 4,685,945 A | 8/1987 | Freund |
| 4,852,968 A | 8/1989 | Reed |
| 5,056,888 A | 10/1991 | Messerly et al. |
| 5,721,800 A | 2/1998 | Kato et al. |
| 6,009,221 A | 12/1999 | Tsuda |
| 6,175,680 B1 | 1/2001 | Arai et al. |
| 6,363,196 B1 | 3/2002 | Rousseau et al. |
| 6,499,318 B1 | 12/2002 | Lemaire et al. |
| 6,625,362 B2 | 9/2003 | Inagaki et al. |
| 6,842,566 B2 | 1/2005 | Ishikawa et al. |
| 6,901,196 B2 | 5/2005 | Takahashi et al. |
| 6,904,218 B2 | 6/2005 | Sun et al. |
| 6,999,667 B2 | 2/2006 | Jang et al. |
| 7,043,125 B2 | 5/2006 | Diep et al. |
| 7,164,835 B2 | 1/2007 | Matsuo et al. |
| 7,203,397 B2 | 4/2007 | Ouchi et al. |
| 7,239,784 B2 | 7/2007 | Hayami et al. |
| 7,366,387 B2 | 4/2008 | Matsuo et al. |
| 7,440,663 B2 | 10/2008 | Matsuo et al. |
| 7,505,657 B2 | 3/2009 | Matsuo et al. |
| 7,526,168 B2 | 4/2009 | Matsuo et al. |
| 7,526,169 B2 | 4/2009 | Bickham et al. |
| 8,385,701 B2 | 2/2013 | Bookbinder et al. |
| 2002/0186941 A1 | 12/2002 | Hsu et al. |
| 2003/0016927 A1 | 1/2003 | Soufiane et al. |
| 2003/0190127 A1 | 10/2003 | Sillard et al. |
| 2003/0223716 A1 | 12/2003 | Christoff et al. |
| 2004/0114892 A1 | 6/2004 | Chiang et al. |
| 2005/0175303 A1 | 8/2005 | Jang et al. |
| 2005/0180709 A1 | 8/2005 | Park et al. |
| 2005/0185906 A1 | 8/2005 | Bickham et al. |
| 2006/0039665 A1 | 2/2006 | Matsuo et al. |
| 2006/0115224 A1 | 6/2006 | Kutami et al. |
| 2007/0189684 A1 | 8/2007 | Matsuo et al. |
| 2007/0189699 A1 | 8/2007 | Matsuo et al. |
| 2008/0101755 A1 | 5/2008 | Matsuo et al. |
| 2010/0166373 A1 | 7/2010 | Nakanishi et al. |
| 2013/0129291 A1* | 5/2013 | Hoshino .............. G02B 6/0281 385/123 |

FOREIGN PATENT DOCUMENTS

| | | |
|---|---|---|
| JP | 2002107555 | 4/2002 |
| JP | 2002274877 | 9/2002 |
| JP | 2007108764 | 4/2007 |
| WO | 2009/104724 | 8/2009 |
| WO | 2013130141 | 9/2013 |

OTHER PUBLICATIONS

International Search Report, issued in connection with corresponding PCT application No. PCT/US2015/039647, Sep. 15, 2015.

\* cited by examiner

OPTICAL FIBER WITH REDUCING HYDROGEN SENSITIVITY

This application claims the benefit of priority under 35 U.S.C. §119 of U.S. Provisional Application Ser. No. 62/022,305 filed on Jul. 9, 2014 the content of which is relied upon and incorporated herein by reference in its entirety.

FIELD

The disclosure is directed to an optical fiber having a high concentration of chlorine and a low concentration of non-bridging oxygen defects in the cladding and to a method for making such fiber. The method includes sintering a preform having a porous chlorine-doped cladding layer in the presence of a reducing agent.

BACKGROUND

The properties of optical waveguides and fibers may be sensitive to the presence of hydrogen or hydrogen-containing gases in the environment of fiber use. This hydrogen sensitivity can result in increased light attenuation at certain wavelengths of concern (e.g., in the telecommunications window). The increase in attenuation has been attributed to chemical groups, such as SiOH and GeOH groups, that absorb light at wavelengths of interest in telecommunications. Hydrogen sensitivity results from conversion of non-bridging oxygen defect (or hole) centers in the glass of the optical fiber or waveguide to SiOH or GeOH groups upon exposure of the fiber or waveguide to hydrogen. In order to reduce hydrogen sensitivity, optical fibers can be treated or chemically annealed with deuterium. The deuterium reacts with the non-bridging oxygen defect centers to passivate non-bridging oxygen defects through formation of SiOD and GeOD groups. SiOD and GeOD groups are stable in the presence of hydrogen and absorb light at wavelengths outside the telecommunications window. The deuterium treatment times necessary to passivate non-bridging oxygen bonds, however, are long and disadvantageous in optical fiber production. It is therefore desirable to reduce the time needed for deuterium treatment to more practical levels for commercial processes.

SUMMARY

The present disclosure is directed to the manufacture of optical fiber having reduced hydrogen sensitivity. In accordance with the present disclosure, a fiber preform is treated with a reducing agent before consolidation. The reducing agent treatment reduces the number of non-bridging oxygen defect centers present in the preform before it is consolidated. After consolidation and subsequent drawing of the consolidated preform into an optical fiber, the optical fiber is treated with deuterium to further reduce or substantially eliminate non-bridging oxygen defect centers in the fiber so that the hydrogen sensitivity of the optical fiber of the fiber is reduced or eliminated. The use of the reducing agent before final consolidation of the optical fiber preform not only results in greater reduction of the non-bridging oxygen defect centers in fibers drawn from the preform, but also reduces the time required for deuterium treatment of the fibers. As a result, manufacturing output is increased and manufacturing costs are reduced.

In one aspect this disclosure is directed to an optical fiber that was formed by the method comprising: providing a preform for making an optical fiber, the perform having a consolidated glass core and at least one porous glass cladding layer; placing the preform in a furnace containing a gas; chlorine doping the porous cladding layer using a chlorine source material, and an optional carrier gas, for example, air, nitrogen, argon or helium; and sintering the at least one porous cladding layer in the presence of a gaseous reducing agent to form a sintered cladding layer on the consolidated glass core, where the at least one sintered cladding layer has a chlorine concentration greater than 500 ppm by weight. The gaseous reducing agent acts to decrease the concentration of oxygen-rich defects in the sintered at least one cladding layer of the consolidated preform and after fully sintering (consolidating) to form an optical fiber preform or blank, an optical fiber is drawn from the sintered preform. The reduction in oxygen-rich defects of the preform due to consolidation of the preform in the presence of a reducing agent includes a reduction in peroxy ($\equiv$Si—O—O—Si$\equiv$) and other oxygen-containing defects that are susceptible to bond cleavage or other modification to form non-bridging oxygen defects ($\equiv$Si—O—). Fibers drawn from preforms consolidated in the presence of a reducing agent also have a reduced concentration of oxygen-rich defects. The reducing agent is selected from the group consisting of $CH_3Cl$, $CH_2Cl_2$, $CHCl_3$, and CO. In an embodiment, the reducing agent is carbon monoxide (CO). In an embodiment, the gaseous reducing agent is provided with carrier gas. In an embodiment, the carrier gas is an inert gas. In an embodiment, the inert gas is helium. In an embodiment, the chlorine source material is selected from the group consisting of $Cl_2$ and $SiCl_4$.

In an embodiment, the disclosure is directed to a method for manufacturing an optical fiber having a core and a cladding, where the optical fiber has reduced hydrogen sensitivity due to a reduction of oxygen-rich defects in the cladding. In one embodiment, the method comprises forming a reducing agent-treated, consolidated optical fiber preform, where the preform comprises a core portion and a cladding portion and the method includes: providing a core soot preform and consolidating the core soot preform to form the core portion; depositing at least one silica-containing cladding soot layer over the core portion and consolidating the at least one silica-containing cladding soot layer to form the cladding portion over the core portion, wherein the cladding soot is treated with a reducing agent during and/or prior to consolidating the cladding soot to reduce oxygen-rich or non-bridging oxygen defect centers in the cladding. An optical fiber may be drawn from the reducing agent-treated, consolidated optical fiber preform. The optical fiber may then be treated with deuterium. The treatment of the cladding soot with the reducing agent during consolidation reduces the time required to treat the optical fiber with deuterium in order to achieve desired hydrogen sensitivity properties relative to a fiber formed from a preform that was not treated with a reducing agent during consolidation. The reducing agent is selected from the group consisting of $CH_3Cl$, $CH_2Cl_2$, $CHCl_3$, and CO. In an embodiment, the reducing agent is carbon monoxide (CO).

In a further embodiment this disclosure provides a method for manufacturing an optical fiber by forming a reducing agent-treated, consolidated optical fiber preform including a core portion and a cladding portion, the method comprising: consolidating a core soot to form the core portion of the preform; consolidating a silica-containing cladding soot deposited on the consolidated core to form the cladding portion over the core portion; and treating the cladding soot with a reducing agent prior to and/or during the consolidation of the cladding soot to form a consolidated optical fiber preform suitable for drawing an optical fiber. Subsequently, an optical fiber may be drawn from the reducing agent-treated, consolidated preform. The drawn optical fiber may then be treated with deuterium. The treatment of the cladding soot with the reducing agent reduces the time required to treat the optical fiber with deuterium in order to achieve desired hydrogen sensitivity properties relative to a fiber formed from a preform that was not treated with a reducing agent during consolidation. The core soot is not treated with a reducing agent prior to and/or during the consolidation of the core soot. The reducing agent is selected from the group consisting of $CH_3Cl$, $CH_2Cl_2$, $CHCl_3$, and CO. In an embodiment, the reducing agent is carbon monoxide (CO).

In an additional embodiment, an optical fiber is provided that is formed by a method comprising: providing a substrate for forming an optical fiber preform; depositing a core soot on the substrate to form a core soot preform; consolidating the core soot preform with treatment of the core soot preform by using a reducing agent prior to and/or during the consolidation to reduce oxygen-rich or non-bridging oxygen defect centers in the core soot; depositing at least one cladding layer on the consolidated core perform; and consolidating the at least one cladding soot layer by using a reducing agent prior to and/or during the consolidation to reduce oxygen-rich or non-bridging oxygen defect centers in the cladding soot.

The present disclosure extends to:
A method of producing an optical fiber comprising:
providing a preform having a consolidated glass core and a first porous glass cladding layer;
exposing the preform to a first gas atmosphere at a first temperature, the first gas atmosphere comprising a chlorine source material, the chlorine source material providing chlorine for doping the first porous glass cladding layer;
exposing the preform to a second gas atmosphere at a second temperature; the second gas atmosphere comprising a reducing agent; and
heating the preform in the presence of the second gas atmosphere at a third temperature; the heating causing sintering of the first porous cladding layer, the sintered first porous cladding layer having a chlorine dopant concentration of at least 500 ppm by weight.

The present disclosure extends to:
An optical fiber comprising a core and at least one cladding layer, the at least one cladding layer including a chlorine dopant concentration of at least 500 ppm by weight, the optical fiber containing less than 1 ppb by weight of OD groups and having a time-to-peak (TTP) hydrogen aging value at 23° C. of less than 100 hours upon exposure to a gas atmosphere having a total pressure of 1 atm and containing a partial pressure of 0.01 atm $H_2$ and a partial pressure of 0.99 atm $N_2$.

Further features, advantages and details of the present disclosure will be appreciated by those of ordinary skill in the art from a reading of the figures and the detailed description of the preferred embodiments that follow, such description being merely illustrative of the present invention.

DETAILED DESCRIPTION

Figure 1:
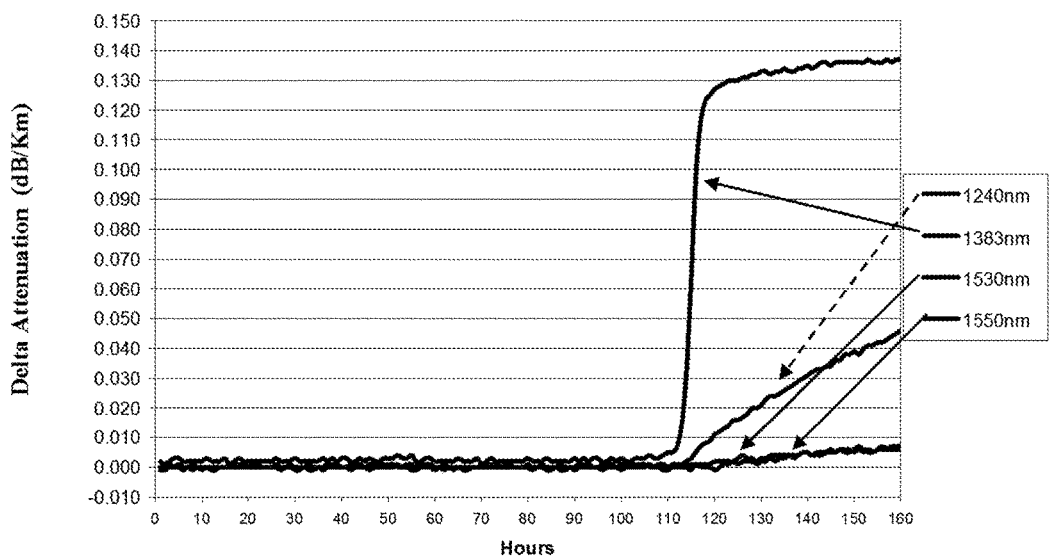
FIG. 1 is an illustration of the typical response of an untreated standard single-mode optical fiber during the hydrogen aging test.

Herein: The terms optical fiber preform(s) and optical fiber blank(s) are used interchangeably. The term "soot" means $SiO_2$ or doped-$SiO_2$ particles; the individual soot particles generally have a size of 0.01 to 10 micrometers in diameter. "Soot preform" means an article made of soot particles that has an open porosity. The terms "porous soot" and "porous glass" are used interchangeably herein. The term "core portion" or "core cane" refers to consolidated glass and may comprise a silica or doped silica glass. The term "consolidated glass" refers to glass in a closed pore state. In some embodiments, the glass is void-free. The term "sintering" refers to the step of going from a porous glass state to a closed porosity state. In some embodiments, the glass becomes void-free in the sintering step. The term optical fiber preform (or consolidated preform, sintered preform or blank) refers to a glass article from which an optical fiber can be drawn. The term Time-to-Peak (TTP) refers to the time elapsed after exposure of a fiber to a hydrogen-containing gas (1% by volume $H_2$ in $N_2$ at 23° C. and 1 atm pressure) at which a sharp increase (>0.005 dB/km) in attenuation is observed at 1383 nm.

Herein an "up-dopant" is a dopant that raises the refractive index of a silica ("$SiO_2$") glass relative to that of pure undoped $SiO_2$; that is, the up-dopant causes the glass refractive index to increase. Also herein a "down-dopant" is a dopant that lowers the refractive index of a silica glass relative to that of pure undoped $SiO_2$ glass. Examples, without limitation, of up-dopants include Ge, Al, P, Ti, Cl, and Br. Examples, without limitation, of down-dopants include non-periodic voids, fluorine and boron. Dopant concentrations in the preform and/or fiber are expressed herein on the basis of weight (e.g., ppm by weight, ppm (by weight), percent by weight, wt. %).

As used herein the phrase "optical fiber having improved bend performance" means an optical fiber made using the teachings of the present disclosure. Fibers in accordance with the present disclosure exhibit lower transmission losses when curved or bent relative to optical fibers that have not been subjected to the methods and treatments disclosed herein. The methods and treatments disclosed herein are directed to the use of a combination of a gaseous reducing agent and chlorine or a chlorine-containing gas during sintering of an optical fiber preform and are applicable to any bendable optical fiber. For example, the methods and treatments disclosed herein can be used to further improve the "Low Bend Loss Optical Fiber" described in U.S. Pat. No. 8,385,701 (the '701 patent). The '701 patent is completely silent on methods for countering the negative effects of chlorine on signal intensity in optical fibers that have greater than 2000 ppm Cl in the overclad. Optical fibers described herein can have diameters of 50 to 300 microns. Optical fibers measured for time-to-peak hydrogen aging are 125 microns in diameter unless otherwise stated.

As used herein, "reducing agent" refers to any gas which reduces the oxidation state of the glass. A reducing agent, for example, reduces the concentration of oxygen-rich defect centers in the glass. Oxygen-rich defect centers include, but are not limited to, non-bridging oxygen hole centers and peroxy radicals.

As used herein, "drying atmosphere" refers to an atmosphere that contains a "drying gas"; and "drying gas", as used herein, refers to a gas including a desired and suitable drying agent, that is compound for drying that acts by removing water and hydroxyl ions in a soot preform. Exemplary drying agents without limitation include: $CCl_4$ $Cl_2$, $Br_2$, $SOCl_2$ and $SiCl_4$. For example and without limitation, a "drying gas" may be He, a mixture of He and $N_2$, and one of $Cl_2$, $CCl_4$, $SiCl_4$, and/or other drying agents. In some embodiments the drying gas includes a drying agent selected from the group consisting of $Cl_2$ and $SiCl_4$. Concentrations of components in the gas phase are expressed herein on the basis of volume (e.g., ppm by volume, ppm (by volume), percent by volume, vol %).

As used herein, "consolidation" or "soot-to-glass consolidation" refers to heating a soot preform to temperatures of at least about 800° C. to perform various process steps such as drying, doping and sintering. In one embodiment, consolidation occurs over a temperature of 800° C. to 1550° C. The stage of consolidation at which the soot preform is heated temperatures below 1050° C. may be referred to herein as the pre-heat step or pre-heating step of consolidation. The pre-heating step may occur at a temperature in the range from 800° C. to 1050° C. In one embodiment, drying and doping are completed in the pre-heating step of consolidation. The stage of consolidation at which the soot preform is heated to a temperature between 1050° C. and 1300° C. may be referred to herein as the intermediate heat step or intermediate heating step of consolidation. The stage of consolidation at which the soot preform is heated to a temperature of at least 1300° C. may be referred to herein as the sinter step or sintering step of consolidation. The sintering step may occur at a temperature in the range from 1300° C. to 1550° C. It is expected that densification of the soot to form glass (e.g. to form vitreous or fused silica, or a doped fused silica) occurs primarily in the sintering step (but may also occur at the intermediate heating step and/or the pre-heating step). Also herein the numeral 10 is used to represent both the "core glass cane" used in forming an optical fiber and the "core of the optical fiber" in order to avoid confusion.

As used herein, "baseline attenuation" means attenuation of the fiber at 1550 nm as measured by Optical Time Domain Reflectometry (OTDR) prior to $H_2$ exposure.

As used herein, "cladding" refers to a glass layer or a plurality of glass layers surrounding an optical fiber core and extending from the outer edge of the core to the outer edge of the optical fiber; and the word "overclad" and similar words refer to the last cladding layer on the optical fiber (the outermost, most radially distant cladding layer).

The present disclosure is described more fully below with reference to the accompanying drawings. However this disclosure may be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout.

Figure 2A:
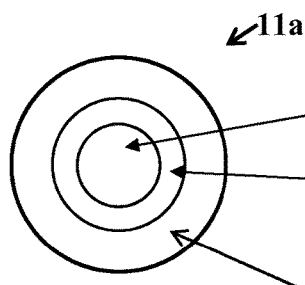
FIG. 2A is a diagram illustrating an up-doped overclad profile for making a low bend loss optical fiber.
Figure 2B:
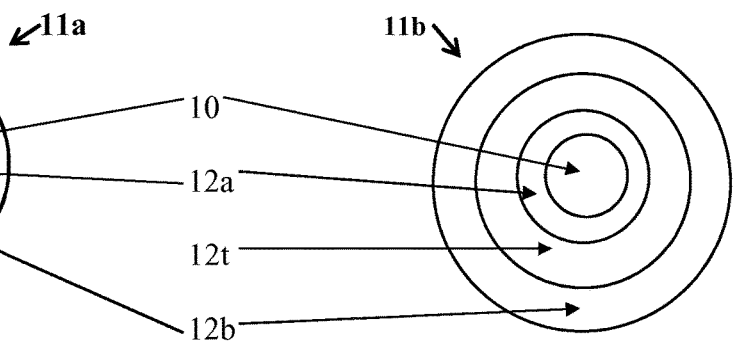
FIG. 2B is a diagram illustrating an up-doped overclad profile with trench for making a low bend loss optical fiber.
Figure 3A:
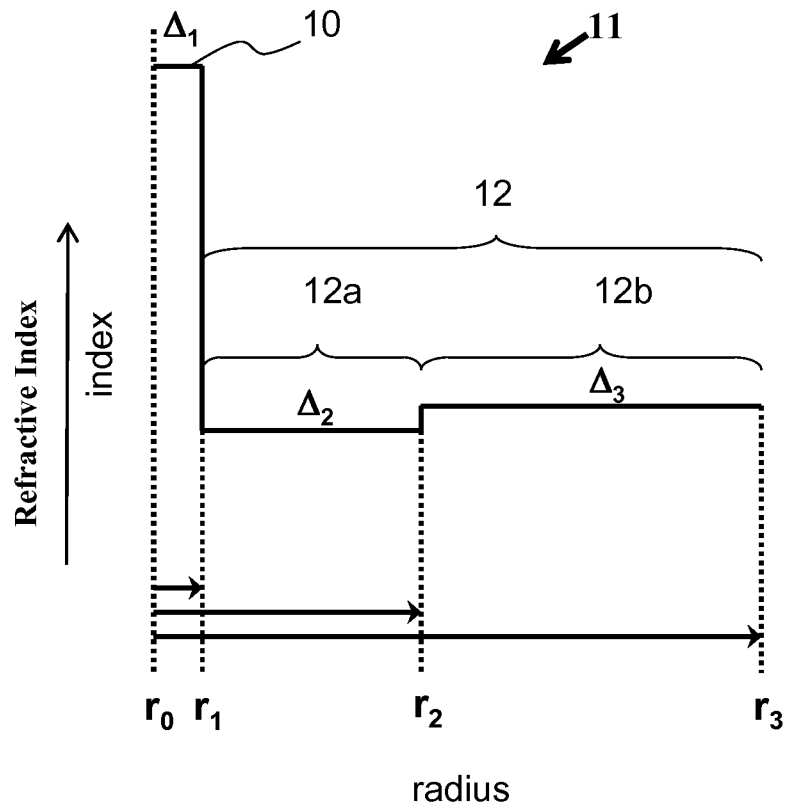
FIG. 3A is an exemplary relative refractive index profile of the optical fiber illustrated in FIG. 2A, the core extending from $r_0$ to $r_1$ and having an index $\Delta_1$, the inner cladding extending from $r_1$ to $r_2$ and having an index $\Delta_2$, and the over cladding extending from $r_2$ to $r_3$ and having an index $\Delta_3$.
Figure 3B:
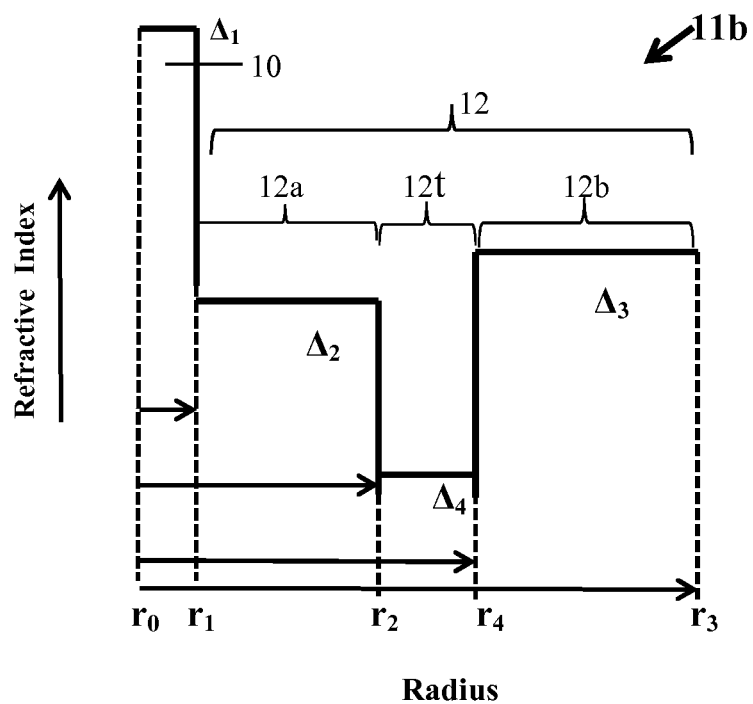
FIG. 3B is an exemplary relative refractive index profile of the optical fiber illustrated in FIG. 2B, the core extending from $r_0$ to $r_1$ and having an index $\Delta_1$, the inner cladding extending from $r_1$ to $r_2$ and having an index $\Delta_2$, a trench of a low refractive index material extending from $r_2$ to $r_4$, and having a refractive index of $\Delta_4$ and the over cladding extending from $r_4$ to $r_3$ and an index $\Delta_3$.

Optical fibers generally consist of a core fiber for transmission of light and one or more cladding layers whose purpose is to keep the transmitted light within the core and reduce the transmission loss over distance. An exemplary step index optical fiber is shown in FIG. 2A, the optical fiber having a core 10, an inner cladding 12a and an outer cladding 12b. A relative refractive index profile for the optical fiber of FIG. 2A is shown in FIG. 3A. The core 10 extends radially from a core center $r_0$ to a core outer edge $r_1$ and has an index $\Delta_1$. The inner cladding 12a extends radially from the core outer edge $r_1$ to the radial distance $r_2$ and has an index $\Delta_2$. The outer cladding 12b extends radially from $r_2$ to the outer edge of fiber at $r_3$ and has an index $\Delta_3$. It will be appreciated from the description herein that optical fibers of alternative suitable constructions can be formed in accordance with the present invention. In some embodiments, there is a trench region designated 12t between the inner and outer cladding regions. A trench region reduces the sensitivity of the optical fiber to bending loss. An example of such a profile is shown in FIGS. 2B and 3B. In FIG. 3B, the core 10 extends radially from a core center $r_0$ to a core outer edge $r_1$ and has an index $\Delta_1$. The inner cladding 12a extends radially from the core outer edge $r_1$ to the radial distance $r_2$ and has an index $\Delta_2$. The trench region 12t extends radially from $r_2$ to radial distance at $r_4$ and has an index $\Delta_4$. The outer clad region 12b extends radially from $r_4$ to the outer edge of fiber at $r_3$ and has an index $\Delta_3$. The index $\Delta_3$ of the outer clad region is higher than the index in the inner cladding region $\Delta_4$ as a result of up-doping of the outer cladding region with chlorine. The index $\Delta_4$ of trench region 12t is achieved by doping the region with a down-dopant such as fluorine.

In addition, optical fibers with an up-doped overclad are being used to improve the bend loss performance. Referring to FIG. 2A, The up-doping of the outer clad 12b with respect to inner clad 12a reduces the fiber cutoff, thereby allowing for increased amount of moat volume that can be accommodated, and the fiber is able to meet the 22 meter ("22 m") "cabled cutoff" requirement of 1260 nm.

Figure 4:
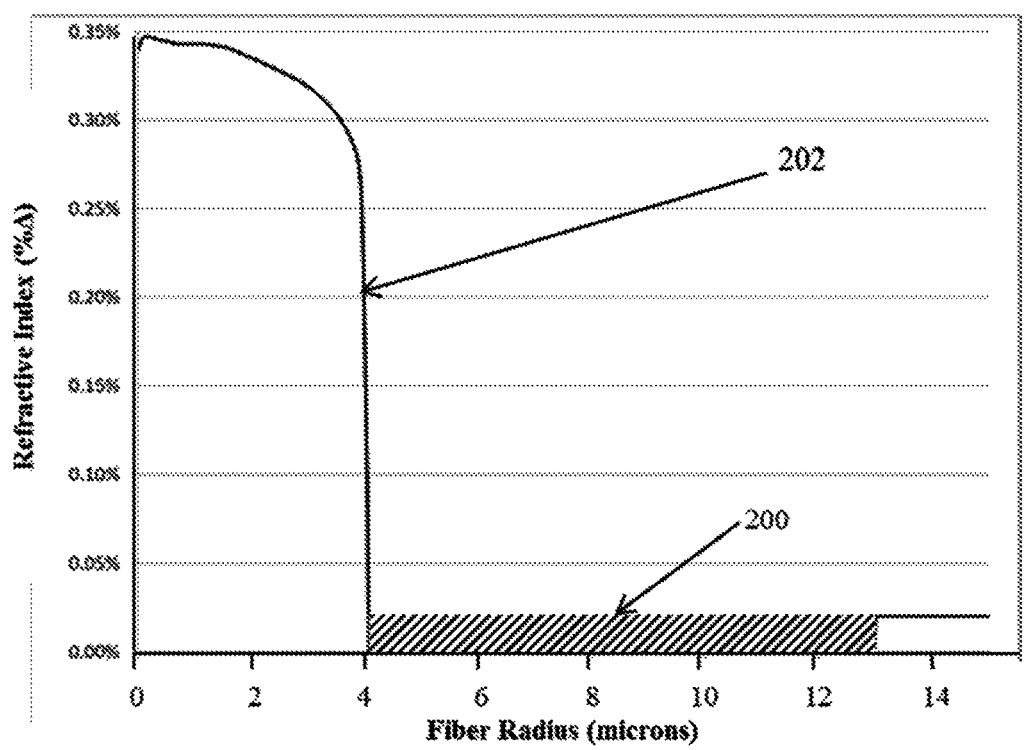
FIG. 4 is a diagram of a step index optical fiber illustrating the "moat volume 200" discussed herein.

The moat volume is the radially-weighted volume of the refractive index well that is constituted by the inner cladding whenever the refractive index of the outer cladding or overclad is up-doped. FIG. 4 is a diagram of a step index optical fiber that illustrates moat volume. Moat volume is depicted as the hatched section designated by reference numeral 200. The depiction in FIG. 4 is limited to a radial position of about 15 μm for purposes of illustration. As is recognized by those of skill in the art, the actual radius of the fiber extends further (such as to 62.5 μm).

Fiber cutoff is measured by the standard 2 meter ("2 m") fiber cutoff test, FOTP-80 (EIA-TIA-455-80, to yield the "fiber cutoff wavelength", also known as the "2 m fiber cutoff" or "measured cutoff" The cabled cutoff (22 meter) requirement is measured using the EIA-445 Fiber Optic Test Procedures, which are part of the EIA-TIA Fiber Optics Standards; that is, the Electronics Industry Alliance-Telecommunications Industry Association Fiber Optics Standards, more commonly known as FOTPs.

Referring to FIGS. 2A and 3A, the up-doping of the outer cladding 12b with respect to the inner cladding 12a is achieved by doping the outer cladding 12b with chlorine, where the concentration of chlorine in the outer cladding 12b is greater than 2000 ppm. In some embodiments, there may be a trench region 12t between the inner and outer cladding layers as illustrated in FIGS. 2B and 3B.

Although up-doping the overclad improves bend loss performance, up-doping with chlorine makes the glass more oxidizing and promotes the formation of oxygen-rich defects in the overclad region of the fiber. Oxygen-rich defects are undesirable because they can negatively impact the fiber performance by attenuating optical signals. This application discloses the use of reducing agents during the soot-to-glass sinter step to negate or counteract the oxidizing effect associated with updoping the overclad layer with chlorine. The gaseous reducing agent is selected from the group of consisting of $CH_3Cl$, $CH_2Cl_2$, $CHCl_3$, and CO. In an embodiment of the disclosure, the reducing agent is carbon monoxide ("CO").

The disclosure can be applied to optical fibers having one or a plurality of cladding layers overlying the central core fiber. When more than one cladding layer is present in the fiber or the preform used to make the fiber, the cladding layer furthest from the core can be called either the outer cladding layer, outer clad, overclad, or overcladding layer. Any cladding layer(s) between the overcladding layer and the core is called an inner clad or inner cladding layer(s).

The methods and apparatus according to the present disclosure can be used to manufacture optical fiber having improved hydrogen sensitivity or aging properties. The present disclosure includes treating the optical fibers with deuterium to reduce or eliminate non-bridging oxygen defect centers so that the hydrogen sensitivity of the optical fiber is reduced. The present disclosure further includes treating the cladding soot of a soot preform from which the optical fiber is formed with a gaseous reducing agent (for example, CO) in order to reduce the deuterium treatment time required to achieve a desired reduction in the concentration of non-bridging oxygen defect centers. Accordingly, the methods of the present disclosure provide improvements in the characteristics of optical fibers and/or in the rate and/or efficiency of manufacture of optical fibers.

In one embodiment, chlorine doping of the soot layer is performed using a chlorine dopant precursor in the intermediate heating step of a soot-to-glass consolidation process at temperatures ranging between 1050° C. to 1300° C. Subsequently, during the sintering step of the soot-to-glass consolidation process that occurs at temperatures ranging from 1300° C. to 1550° C., no chlorine doping precursor is used and a reducing agent is used during the sintering. That is, in the sintering step, the chlorine doping source is turned off and a reducing agent, or gas including a reducing agent, is introduced. The residual chlorine doping precursor may also be removed before or during the sintering step.

In another embodiment, the disclosure is directed to treating the cladding soot of a soot preform from which the optical fiber is formed with a mixture of a chlorine-containing gas and a gaseous reducing agent in order to reduce the deuterium treatment time required to achieve a desired level of non-bridging oxygen defect center reduction. The gaseous reducing agent is selected from the group of consisting of $CH_3Cl$, $CH_2Cl_2$, $CHCl_3$, and CO.

In one aspect the disclosure is directed to a method using a mixture of $Cl_2$ and CO during the sintering of an optical fiber preform into a glass optical fiber having a core and overclad layer and at least one inner clad layer between the core and the overclad layer. In an embodiment of the method, the CO concentration level in the gas phase of the sinter environment is greater than 1000 ppm (by volume). In another embodiment, the CO concentration level in the gas phase of the sinter environment is greater than 3000 ppm (by volume). In a further embodiment, the CO concentration level in the gas phase of the sinter environment is greater than 5000 ppm (by volume).

In some embodiments, the ratio of ppm (by volume) of CO in the sinter gas to ppm (by weight) Cl in the glass cladding is greater than 0.5. In some embodiments, the ratio of ppm (by volume) of CO in the sinter gas to ppm (by weight) Cl in the glass cladding is greater than 1. In other embodiments, the ratio of ppm (by volume) of CO in the sinter gas to ppm (by weight) Cl in the glass cladding is greater than 2.

In one aspect, the disclosure is directed to a method for improving the bend loss performance of an optical fiber, the method comprising providing a preform for making an optical fiber having a consolidated glass core and at least one porous glass cladding layer; sintering and chlorine up-doping the at least one porous cladding layer using a carrier gas containing a chlorine source material to form a sintered optical fiber blank, said blank having a chlorine concentration greater than 2000 ppm by weight in the outer cladding of the at least one cladding layer. In an embodiment, the sintering with the carrier gas containing the chlorine source material increases the oxygen-rich defects in the at least one chlorine doped layer, the chlorine-containing carrier gas further contains a gaseous reducing agent to decrease the oxygen-rich defects in the at least one cladding layer. In an embodiment the oxygen-rich defects in the cladding are reduced during sintering after the chlorine up-doping by the use of a gaseous mixture comprising a carrier gas and a gaseous reducing agent selected from the group consisting of $CH_4$, $CH_3Cl$, $CH_2Cl_2$, $CHCl_3$ and CO. In another embodiment, the gaseous reducing agent is CO and the carrier gas is helium. In a further embodiment, the chlorine dopant source material is used only during the pre-heat step of the soot-to-glass consolidation process at temperatures ranging between 1050° C. to 1300° C. and the reducing agent is used during the sintering step of the soot-to-glass consolidation process at temperatures at or above 1300° C., such as at temperatures ranging between 1300° C. to 1500° C. In still another embodiment, the mixture of the chlorine dopant and reducing agent is used only in the pre-heat step, at temperatures in the range of 1050° C. to 1300° C., and no chlorine dopant or reducing agent is used in the sinter step at the temperatures ranging between 1300° C. to 1500° C. When the number of cladding layers is greater than one, the last cladding layer is termed the overclad layer or outer clad layer and the layer(s) between the overclad layer and the core are termed the inner clad layers. The overclad layer may have a chlorine content of greater than 2000 ppm by weight.

In addition, in accord with an embodiment of this disclosure, the oxygen-rich defects are further decreased after sintering by the use of a carrier gas containing a component from the group consisting (i) a gaseous reducing agent and (ii) a mixture of a gaseous reducing agent and gaseous chlorine source; the gaseous reducing agent being selected from the group consisting of, $CH_3Cl$, $CH_2Cl_2$, $CHCl_3$ and CO. In an embodiment, the gaseous reducing agent is CO and the CO concentration in the gaseous sintering environment is greater than 1000 ppm (by volume). In another embodiment, the CO concentration in the gaseous sintering environment is greater than 3000 ppm (by volume). In a further embodiment, the CO concentration in the gaseous sintering environment is greater than 5000 ppm (by volume). Further, the ratio of ppm (by volume) CO in the sinter gas to ppm (by weight) Cl in the glass cladding is greater than 0.5. In an embodiment, the ratio of ppm (by volume) CO in the sinter gas to ppm (by weight) Cl in the glass cladding is greater than 1.0. In another embodiment, the ratio of ppm (by volume) CO in the sinter gas to ppm (by weight) Cl in the glass cladding is greater than 2.0. Additionally, in an embodiment, the volumetric ratio of CO to the chlorine precursor in the sinter gas environment is greater than 0.05. In another embodiment, the volumetric ratio of CO to the chlorine precursor in the sinter gas environment is greater than 0.1. In a further embodiment, the volumetric ratio of CO to the chlorine precursor in the sinter gas environment is greater than 0.2.

In another aspect, the disclosure is directed to an optical fiber made according the various embodiments of the foregoing paragraph, and the optical fiber has Time-to-Peak (TTP) hydrogen aging value at least 20% less than an optical fiber made without the use of a gaseous reducing agent. In an embodiment, the optical fiber has Time-to-Peak hydrogen aging value at least 40% less than an optical fiber made without the use of a gaseous reducing agent.

In addition, the disclosure is directed to an optical fiber having improved bend performance, said optical fiber comprising a core and at least one cladding layer, the at least one cladding layer containing greater than 2000 ppm by weight Cl in the outermost layer of said at least one cladding layer, and the optical fiber having a Time-to-Peak hydrogen aging value of less than 120 hours. In an embodiment, the at least one cladding layer of the optical fiber contains greater than 2000 ppm by weight Cl in the outermost layer of said at least one cladding layer and the optical fiber has a Time-to-Peak hydrogen aging value of less than 80 hours. In another embodiment, the at least one cladding layer of the optical fiber contains greater than 2000 ppm by weight Cl in the outermost layer of said at least one cladding layer and the optical fiber has a Time-to-Peak hydrogen aging value of less than 60 hours.

Optical fibers are routinely tested for hydrogen aging. In the hydrogen aging testing, the fibers are nominally exposed to a hydrogen-containing gas at 23° C. For purposes of this disclosure, the hydrogen-containing gas is at a total pressure of 1.0 atm and includes a partial pressure of 0.01 atm of hydrogen ($H_2$) gas and a partial pressure of 0.99 atm of nitrogen ($N_2$) gas. During the hydrogen aging test, various wavelengths of light are introduced to the fiber and monitored for changes in attenuation, referenced to the initial attenuation of a loose coil. A wavelength of interest for telecommunications applications is 1383 nm. In the hydrogen aging tests of the present disclosure, this wavelength is monitored not only for the absolute or relative change in attenuation, but also for the time of exposure of the fiber to the hydrogen-containing gas at which the attenuation increase occurs. The elapsed time from when the fiber is exposed to the hydrogen-containing gas to the time that the 1383 nm increase occurs is referred to herein as the 1383 nm "time-to-peak" (or "Time-to-Peak") value (which may be abbreviated herein as TTP). The importance of this measurement is that when exposed to hydrogen for a time as described below, reactive oxygen centers in the glass react with the hydrogen to form —OH species that absorb light at the telecommunications wavelengths, the absorbance being the greatest at about 1383 nm. The formation of absorbing —OH species upon exposure of the fiber to hydrogen gas over time is a process referred to herein as hydrogen aging. In order to prevent such aging and absorbance, which results in reduced transmission signal strength, optical fibers are treated with deuterium gas to forms —OD species from reactive oxygen centers present in the fiber. Unlike —OH, —OD does not absorb at 1383 nm.

The origin of hydrogen aging can be attributed to several phenomena. One phenomenon is the interstitial hydrogen effect, which corresponds to the absorption of light by unreacted molecular hydrogen that has diffused into the fiber. Absorption by interstitial hydrogen occurs within the optical communications window at predominately at ~1242 nm and at wavelengths in excess of ~1500 nm. This phenomenon is reversible, meaning that if the fiber is allowed to fully outgas there will be no permanent absorption.

A second phenomenon that contributes to hydrogen aging occurs when the glass is oxygen-rich. Oxygen-rich glasses contain a high concentration of defect known as "peroxyl linkages", or ≡Si—O—O—Si≡ species. Peroxyl linkages are easily cleaved by the heat and tension present during the fiber draw process. Cleavage of peroxyl linkages results in either two non-bridging oxygen hole centers ("NBOHC") (≡Si—O—O—Si≡→≡Si—O.+.O—Si≡), or an E' center and a peroxy radical (≡Si—O—O—Si≡→≡Si.+.O—O—Si≡). Any such defects that do not recombine upon cooling may react with hydrogen to form an absorbing species that attenuates an optical signal. NBOHCs react with hydrogen to form Si—O—H groups, which absorb at ~1383 nm. Peroxy radicals and E' centers react with hydrogen to form HO—O—Si≡ and ≡Si—H groups that absorb at wavelengths longer than 1383 nm (e.g. ~1415 nm and ~1530 nm). Peroxyl linkages may be regarded as precursors to non-bridging oxygen hole centers, E' centers and peroxy radicals.

Alternatively, the glass matrix itself (for example, a glass containing Si and Ge oxides, ≡Si—O—Si≡, ≡Ge—O—Si≡ and ≡Ge—O—Ge≡) may form broken bonds during the drawing process to form E' centers, silica NBOHCs, ≡SiO., ≡Ge—O. and/or ≡Ge. defects. These defects react with hydrogen to form absorptions at various wavelengths, with the predominant effect being a broad absorption centered at ~1430 nm attributed to ≡Ge—O—H.

Optical fibers with up-doped overclad made as disclosed herein were developed to improve the bend loss performance. The up-doping of the overclad with respect to inner clad (see FIG. 2a for an example) reduces the fiber cutoff, thereby allowing for increased amount of moat volume that can be accommodated and allowing the fiber to meet the 22 meter cable cutoff requirement of 1260 nm.

The up-doping of the overclad with respect to the inner clad is achieved by doping the overclad with chlorine and it is desirable that the concentration of chlorine in the overclad glass be between 200 ppm (by weight) and 20000 ppm (by weight). The concentration of chlorine in the overclad may be greater than 500 ppm (by weight), or greater than 1000 ppm (by weight), or greater than 2000 ppm (by weight), or greater than 4000 ppm (by weight), or greater than 6000 ppm (by weight) or greater than 8000 ppm (by weight), or greater than 10000 ppm (by weight). Chlorine doping of the overclad is achieved during the soot-to-glass sinter process by using a chlorine dopant precursor, for example without limitation, chlorine gas ($Cl_2$), $SiCl_4$ and $CCl_4$, or combination thereof. The chorine dopant precursor(s) may be used alone or in combination with an inert gas. In one embodiment, the chlorine dopant precursor(s) is a component of a gas that includes helium as a predominant component.

As the increased incorporation of chlorine makes the glass more oxidizing, it can increase the magnitude of oxygen-rich defects in the overclad region of the fiber, which can negatively impact the fiber performance during the hydrogen aging test. As is disclosed herein, it is advantageous that the gas atmosphere in which the soot-to-glass sinter process is performed includes a reducing agent (such as CO). In one embodiment, the chlorine dopant precursor is used in the pre-heat step and/or intermediate heating step, and a reducing agent is used in the intermediate heating step and/or sintering step of the soot-to-glass consolidation process. In another embodiment, the chlorine dopant precursor and the reducing agent are used only in the preheat step and/or the intermediate heating step, with no chlorine dopant precursor or reducing agent used in the sintering step. In yet another embodiment, no chlorine dopant precursor or reducing agent is used in the pre-heat step and both chlorine dopant precursor and reducing agent are used in the intermediate heating and/or sinter step of the soot-to-glass consolidation process.

Figure 5:
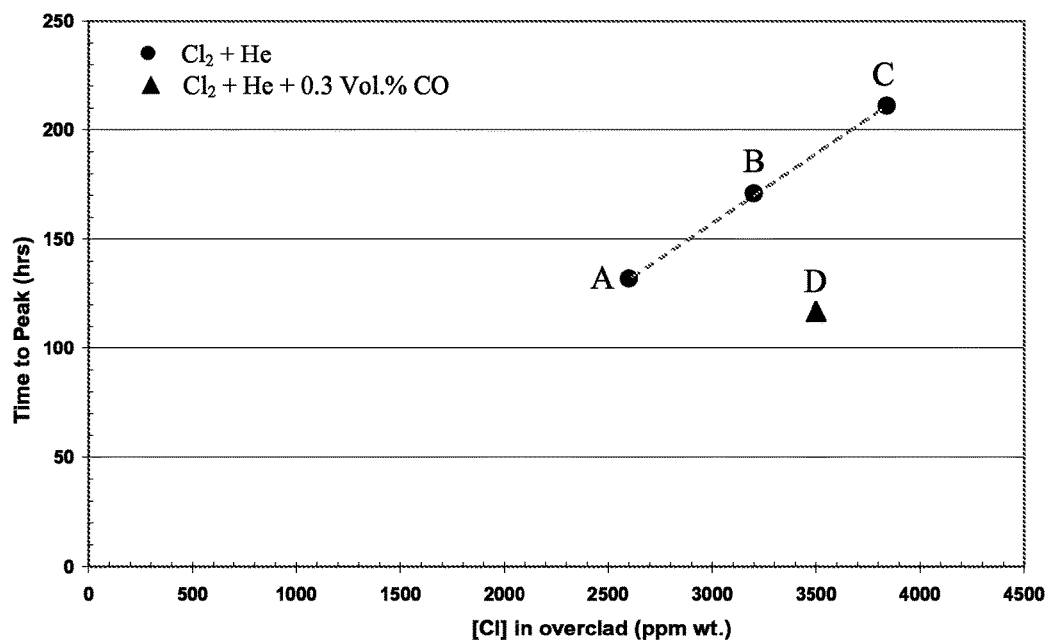
FIG. 5 is a graph illustrating the effect on Time-to-Peak ("TTP") at 1383 nm for optical fibers exposed to hydrogen, 1% $H_2$ by volume in $N_2$, for glass samples consolidated in a $He/Cl_2$ atmospheres containing different concentrations of $Cl_2$ in He ("●") and a $He/Cl_2+CO$ ("▲") atmosphere containing the highest $Cl_2$ concentration used in the $He/Cl_2$ determination of TTP.

The increase in the oxygen-rich defect concentration is shown in FIG. 5, where an increase in Time-to-Peak (TTP) for elevated attenuation is seen to increase with overclad chlorine concentration (due to increased formation of oxygen-rich defects) when the fiber is exposed to a hydrogen aging test gas containing 1% hydrogen and 99% $N_2$ at 23° C. As indicated above, TTP can be decreased by incorporating a gaseous reducing agent in the chlorine-containing sinter gas because the reducing agent counteracts the oxidizing effects of chlorine. In FIG. 5, TTP was determined for glass samples "●" labeled A, B and C that were consolidated in atmosphere containing 10 Vol. %, 25 Vol. % and 35 Vol. % $Cl_2$ in He, respectively; and the glass sample D indicated by symbol ▲ was consolidated in an atmosphere containing 35 Vol. % $Cl_2$ and 0.3 Vol. % CO in He. Sample C had the highest oxygen-rich defect value as shown by the greater than 200 hour TTP value. The use of reducing agents, for example CO, during the soot-to-glass sinter step was found to negate the oxidizing effect of higher chlorine concentration in the overclad layer. As indicated by the results shown in FIG. 5, the use of 3000 ppm (0.3 Vol. %) CO and 35 Vol. % $Cl_2$ during the sintering of an overclad glass resulted in a glass, glass D, having 3500 ppm chlorine with a TTP value that has been decreased by approximately about 40% relative to the same glass sintered using 35 Vol. % $Cl_2$ in He, but without CO (glass C).

In one embodiment, the optical fiber includes a core and at least one cladding layer, where the at least one cladding layer includes a chlorine dopant concentration of at least 500 ppm by weight or at least 1000 ppm by weight, or at least 2000 ppm by weight, or at least 4000 ppm by weight, or at least 6000 ppm by weight, or at least 8000 ppm by weight, or at least 10000 ppm by weight, and the optical fiber has a time-to-peak (TTP) hydrogen aging value at 23° C. of less than 100 hours, or less than 80 hours, or less than 60 hours, or less than 40 hours, or less than 20 hours upon exposure to a gas atmosphere having a total pressure of 1 atm and containing a partial pressure of 0.01 atm $H_2$ and a partial pressure of 0.99 atm $N_2$.

In one embodiment, the optical fiber includes a core and at least one cladding layer, where the at least one cladding layer includes a chlorine dopant concentration of at least 500 ppm by weight or at least 1000 ppm by weight, or at least 2000 ppm by weight, or at least 4000 ppm by weight, or at least 6000 ppm by weight, or at least 8000 ppm by weight, or at least 10000 ppm by weight, the optical fiber contains less than 1 ppb by weight of OD groups and the optical fiber has a time-to-peak (TTP) hydrogen aging value at 23° C. of less than 100 hours, or less than 80 hours, or less than 60 hours, or less than 40 hours, or less than 20 hours upon exposure to a gas atmosphere having a total pressure of 1 atm and containing a partial pressure of 0.01 atm $H_2$ and a partial pressure of 0.99 atm $N_2$.

In one embodiment, the optical fiber has a time-to-peak (TTP) hydrogen aging value upon exposure to a gas atmosphere containing 1% $H_2$ and 99% $N_2$ at 23° C. that is at least 20% less than, or at least 40% less than, or at least 60% less than the corresponding TTP of a fiber having a sintered porous cladding layer with a chlorine dopant concentration of at least 500 ppm by weight, or at least 1000 ppm by weight, or at least 2000 ppm by weight, or at least 4000 ppm by weight, or at least 6000 ppm by weight, or at least 8000 ppm by weight, or at least 10000 ppm by weight that was drawn from a preform that was not heated in the presence of the reducing agent.

The CO concentration level is preferably higher than 1000 ppm (by volume) in the intermediate heating step and/or sintering step of the soot-to-glass processing environment, in some embodiments higher than 3000 ppm (by volume), in some embodiments higher than 5000 ppm (by volume), and in some embodiments the CO concentration is between 1000 to 10,000 ppm (by volume). In an embodiment, the ratio of ppm (by volume) CO in the intermediate heating step and/or sintering step of the soot-to-glass processing environment to ppm (by weight) Cl in the glass overclad is greater than 0.5. In other embodiments, ratio of ppm (by volume) CO in the intermediate heating step and/or sintering step of the soot-to-glass processing environment to ppm (by weight) Cl in the glass overclad is greater than 1. In another embodiment, the ratio of ppm (by volume) CO in the pre-heat step and/or sintering step of the soot-to-glass processing environment to ppm (by weight) Cl in the glass overclad is greater than 2.

In an embodiment, the reducing agent treatment is done for an overclad layer that has greater than 2000 ppm (by weight) chlorine. In an embodiment, the reducing agent treatment is done for an overclad layer that has greater than 4000 ppm (by weight) chlorine. In a further embodiment, the reducing agent treatment is done for an overclad layer that has greater than 6000 ppm (by weight) chlorine. In another embodiment, the reducing agent treatment is done for an overclad layer that has greater than 8000 ppm (by weight) chlorine. In still another embodiment, the reducing agent treatment is done for an overclad layer that has greater than 10000 ppm (by weight) chlorine.

The methods and apparatus according to the present disclosure may be used to manufacture optical fiber having desirable or improved hydrogen sensitivity or aging properties. The present disclosure includes forming an optical fiber preform with a process in which a reducing agent is included in the intermediate heating stage and/or sintering step of the soot-to-glass process, drawing optical fibers from the preform, and optionally treating the optical fibers with deuterium to reduce or eliminate non-bridging oxygen defect centers so that the hydrogen sensitivity of the optical fiber (sensitivity of the optical fiber to hydrogen aging) is reduced. The present disclosure further includes treating the cladding soot of a soot preform from which the optical fiber will be formed with a mixture of a reducing agent (e.g. CO) in order to reduce the deuterium treatment time required to achieve a desired level of non-bridging oxygen defect center reduction. Accordingly, the methods of the present disclosure may provide improvements in the characteristics of optical fibers and/or in the rate and/or efficiency of manufacture of optical fibers.

Figure 6:
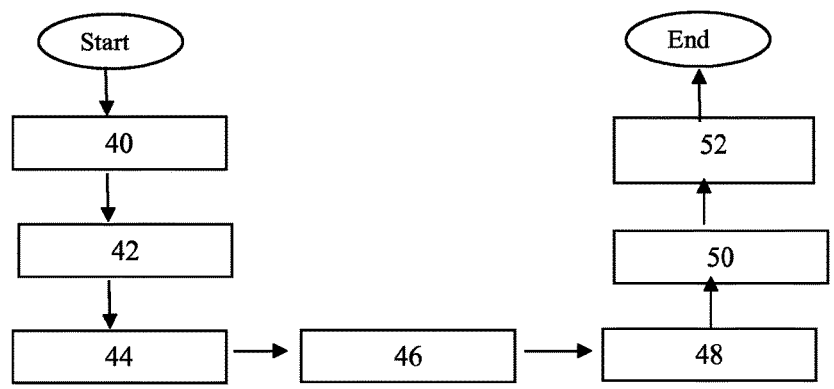
FIG. 6 is a flow chart illustrating an OVD procedure for manufacturing optical fiber in accordance with the present disclosure from forming the core soot preform to deuterium treatment of drawn optical fiber.

FIG. 6 is a flow chart illustrating an exemplary method for manufacturing optical fiber and, in accordance with the present disclosure, illustrates the provision of an optical fiber preform that has been treated with a reducing gas and consolidated, drawing the glass blank (consolidated optical fiber preform) to form an optical fiber, and treating the drawn fiber with deuterium. In FIG. 6, the method comprises:

at block 40, providing a mandrel or substrate and depositing a silica-containing core soot on the substrate to form a porous core soot preform;

at block 42, removing the mandrel, consolidating (including sintering) the porous core soot preform, and drawing the consolidated core soot preform to form a core cane;

at block 44, providing the core cane and depositing at least one cladding layer on the core cane to thereby form a preform having a consolidated core and at least one porous cladding layer thereon;

at block 46, the at least one porous cladding layer is processed, where the processing may include chlorine doping the at least one porous soot cladding layer using a chlorine source material, and optionally a carrier gas admixed with the chlorine source material;

at block 48, ceasing the chlorine doping process and consolidating (including sintering) the at least one chlorine-doped porous cladding layer in the presence of a gas to form an optical fiber preform having an outer clad with a chlorine concentration greater than 500 ppm by weight, wherein the gas atmosphere in the chlorine doping and/or consolidating and/or sintering step contains a gaseous reducing agent to decrease the oxygen-rich defects in the sintered at least one cladding layer;

at block 50, drawing the consolidated optical fiber preform into an optical fiber; and at block 52, treating the drawn optical fiber in a deuterium-containing atmosphere to further reduce any remaining oxygen-rich defects in the fiber and convert —OH sites in the fiber to —OD sites.

Figure 7:
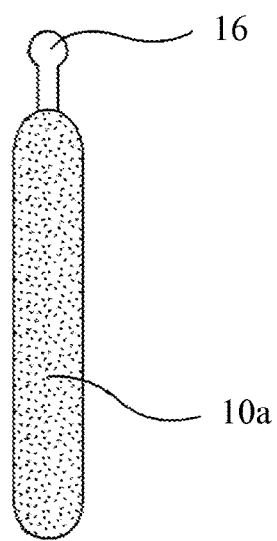
FIG. 7 is a frontal view of a core soot preform formed using a method according to embodiments of the present invention.

At block 40, a core soot preform is formed. FIG. 7 shows exemplary core soot preform 10a with handle 16. The core soot preform 10a may be formed using any suitable method, such as chemical vapor deposition (CVD) (e.g., outside vapor deposition (OVD), vapor axial deposition (VAD), modified chemical vapor deposition (MCVD), plasma chemical vapor deposition (PCVD)) or any other suitable technique such as sol-gel processing or flame hydrolysis. The core soot preform 10a may be formed from pure silica or doped silica (for example, silica doped with a suitable dopant or dopants including, but not limited to, germania, boron, fluorine, antimony, erbium, aluminum, titanium, tantalum and/or chlorine). The core soot preform 10a is a porous structure defining a plurality of interstices. The core soot preform 10a may include a passage extending the full length thereof from which a mandrel of the deposition apparatus has been removed. According to some embodiments, the core soot preform 10a has a density of no greater than about 1.0 g/cc, preferably of no more than about 0.7 g/cc, and more preferably of no more than about 0.6 g/cc.

At block 42 of FIG. 6, the core soot preform 10a is consolidated to form a consolidated core glass preform and the consolidated core glass preform is drawn to form a core cane. The consolidation of the core soot preform 10a includes sintering and may include other process steps such as drying and/or doping. The consolidation of the core soot preform 10a may employ any suitable or desired processes or parameters consistent with the methods described herein. Suitable apparatus for consolidating the core soot preform 10a and drawing the consolidated core soot preform to form a core cane are known to those of skill in the art.

The core soot preform 10a may or may not be treated with a reducing agent during consolidation. In one embodiment, the core soot preform 10a is treated with a reducing agent before or during consolidation, but such treatment is at level and under conditions insufficient to increase the baseline attenuation of the fiber ultimately drawn from the consolidated core by more than 1.5% at a wavelength of 1550 nm relative to fiber not treated with a reducing agent during consolidation but otherwise formed in the exact same manner as the fiber formed by the present methods.

At block 44 of FIG. 6, cladding soot is formed over the core cane. The cladding soot may include one or more layers, the outermost of which corresponds to the overclad. The assembly of cladding soot and core cane may be referred to herein as an overclad preform or cladding soot preform. The cladding soot may be formed using any suitable method, such as chemical vapor deposition (CVD) (e.g., outside vapor deposition (OVD), vapor axial deposition (VAD), modified chemical vapor deposition (MCVD), plasma chemical vapor deposition (PCVD)) or any other suitable technique such as sol-gel processing. The cladding soot may be formed on the core cane by depositing the cladding soot directly onto the core cane by chemical vapor deposition, pressing soot onto the core cane, or by forming a tubular cladding soot blank and inserting the core cane into the cladding soot blank. The cladding soot (or layers thereof) may be formed of pure silica or may be formed of doped silica (for example, silica doped with a suitable dopant or dopants including, but not limited to, germania, boron, fluorine, antimony, erbium, aluminum, titanium, tantalum and/or chlorine). As indicated hereinabove, the cladding soot may include multiple layers that differ in doping and refractive index to provide fiber index profiles such as those shown in FIGS. 3A and 3B. The cladding soot is a porous structure defining a plurality of interstices. According to some embodiments, the cladding soot has a density of no greater than about 1.0 g/cc, preferably of no more than about 0.7 g/cc, and more preferably of no more than about 0.6 g/cc.

At blocks 46 and 48 of FIG. 6, the soot cladding preform is processed and consolidated in accordance with the methods described herein. As noted hereinabove, the soot cladding preform consolidation process effects a soot-to-glass transformation of the one or more layers of the soot cladding and may include a pre-heat step, an intermediate heating step, and a sintering step, where one or more of the pre-heat step, intermediate heating step, and sintering step may include treatment of the soot cladding preform with a reducing agent. Processing of the soot cladding preform may also include a drying step and a doping step. In the drying step, the soot cladding preform is treated with a drying agent. The drying step may be performed at a temperature of between about 800° C. and 1300° C., including in one or both of the pre-heating step and intermediate heating step described hereinabove. The drying agent penetrates the pores of the soot cladding and reacts with water or OH groups to remove water and OH groups from the fiber preform. The drying agent may also remove transition metals or other impurities that may be present in the soot cladding. Suitable drying agents include chlorine-containing gases such as $Cl_2$, $SiCl_4$, $GeCl_4$, $SOCl_2$, and/or $POCl_3$. The drying agent may optionally be diluted in an inert gas such as He, Ar, Ne and/or $N_2$. In some embodiments, the drying gas contains less than about 5 volume % chlorine, such as between about 0.01 and 3.0 volume % chlorine.

In some embodiments, the drying step is followed by a chlorine doping step in which the soot cladding preform is exposed to a chlorine dopant precursor. The chlorine dopant precursor is comprised of chlorine ($Cl_2$), $SiCl_4$, $CCl_4$, or mixtures thereof. In one embodiment, the chlorine doping is performed during the pre-heat step of the soot-to-glass consolidation process. In another embodiment, the chlorine doping is performed during the intermediate heating step. In still another embodiment, the chlorine doping is performed during the sintering step of the soot-to-glass consolidation process. In various embodiments, the chlorine doping level is in the range of greater than 200 ppm by weight and less than 20,000 ppm by weight. In one embodiment, the chlorine doping level in the consolidated glass is in the range of 200 ppm by weight to 20,000 ppm by weight. In an embodiment, the chlorine doping level is greater than 500 ppm by weight. In another embodiment, the chlorine doping level is greater than 2000 ppm by weight. In a further embodiment the chlorine doping level is greater than 4000 ppm by weight. In an additional embodiment, the chlorine doping level is greater than 6000 ppm by weight.

The reducing agent is selected from the group consisting of $CH_3Cl$, $CH_2Cl_2$, $CHCl_3$, CO, and combinations thereof. The reducing agent may be supplied neat or in combination with one or more other gases. According to some embodiments, the cladding soot is exposed to a reducing agent-containing gas that includes at least 0.1 volume % CO, or between 0.1 volume % CO and 1.0 volume % CO, or between 0.4 and 0.6 volume % CO. The balance of the reducing agent-containing gas may be an inert gas (e.g. $N_2$, Ar, Ne, He) or a combination of an inert gas with $Cl_2$, or $Cl_2$. The concentration of $Cl_2$ in the reducing agent-containing gas may be less than about 2 volume % or between about 1 volume % and 2 volume %.

According to some embodiments, the cladding soot is exposed to the reducing agent during the soot-to-glass process for a treatment time of between about 2 and 10 hours and at a temperature of between about 800° C. and 1500° C., or a temperature of between about 1100° C. and 1500° C. or a temperature of between about 1300° C. and 1500° C.

The concentration of reducing agent in the reducing agent-containing gas, the temperature of treatment of the soot cladding with the reducing agent-containing gas, and the time of treatment of the soot cladding with the reducing agent-containing gas are selected to provide a selected level of oxidation state reduction to the cladding soot 12a,12b depending on the level of chlorine doping level of the cladding soot. According to some embodiments, the temperature of treatment of the soot cladding with the reducing agent-containing gas is at least about 800° C. According to some embodiments, the temperature of treatment of the soot cladding with the reducing agent-containing gas is between about 800° C. and 1500° C. The treatment temperature may be constant or varied. According to some embodiments, the time of treatment of the soot cladding with the reducing agent-containing gas is between about 120 and 600 minutes.

According to some embodiments, the time of treatment of the soot cladding with the reducing agent-containing gas is between about 120 and 240 minutes. According to some embodiments, the reducing agent-containing gas is provided to the soot cladding at a flow rate of between about 0.002 and 0.2 slpm.

In one embodiment, the treatment of soot cladding preform with a reducing agent and the sintering step overlap so that the soot cladding is exposed to the reducing agent during the sintering step. The introduction of the reducing agent-containing gas may be initiated prior to, after, or substantially simultaneously with the beginning of the sintering step. Two or more cycles of treatment of the soot cladding preform with the reducing-agent containing gas may be executed at any point during the soot-to-glass consolidation process. According to some embodiments, the reducing agent-containing gas is present in the treatment chamber for at least 50% of the duration of the sintering step. According to some embodiments, the reducing agent-containing gas is present in the treatment chamber throughout the entirety of the sintering step. According to some embodiments, the treatment of the soot cladding preform with the reducing agent-containing gas is performed in a single treatment cycle that is substantially coextensive with the sintering step of the soot-to-glass consolidation process. According to certain preferred embodiments, the soot cladding is only exposed to the reducing agent-containing treatment gas during the sintering step. According to some embodiments, none of the chlorine-containing gas is flowed into the treatment chamber during or following the reducing agent-containing gas treatment step(s).

The method of producing an optical fiber may include providing a preform having a consolidated glass core and a porous glass cladding layer; exposing the preform to a first gas atmosphere at a first temperature where the first gas atmosphere includes a chlorine source material and the chlorine source material provides chlorine for doping the first porous glass cladding layer; exposing the preform to a second gas atmosphere at a second temperature where the second gas atmosphere includes a reducing agent; and heating the preform in the presence of the second gas atmosphere at a third temperature where the heating causes sintering of the porous cladding layer and the sintered porous cladding layer has a chlorine dopant concentration of at least 500 ppm by weight. In embodiments of the method, the first temperature may be at least 800° C., or at least 1050° C., or between 800° C. and 1100° C.; the second temperature may be greater than or equal to the first temperature or the second temperature may be greater than the first temperature; the third temperature may be greater than or equal to the second temperature or the third temperature may be greater than the second temperature or the third temperature may be at least 1100° C., or the third temperature may be at least 1200° C., or the third temperature may be at least 1300° C., or the third temperature may be between 1100° C. and 1500° C.; the chlorine source material may include $Cl_2$, $SiCl_4$, and/or $CCl_4$; the reducing agent may include CO, $CH_3Cl$, $CH_2Cl_2$, and/or $CHCl_3$; and/or the porous cladding layer may have a chlorine dopant concentration of at least 1000 ppm by weight, or at least 2000 ppm by weight, or at least 4000 ppm by weight, or at least 6000 ppm by weight, or at least 8000 ppm by weight, or at least 10000 ppm by weight.

Figure 9:
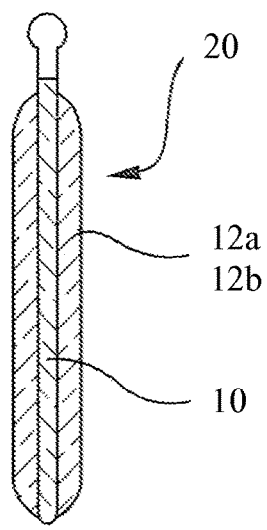
FIG. 9 is a cross-sectional frontal view of a consolidated glass preform formed using a method according to embodiments of the present invention.
Figure 8:
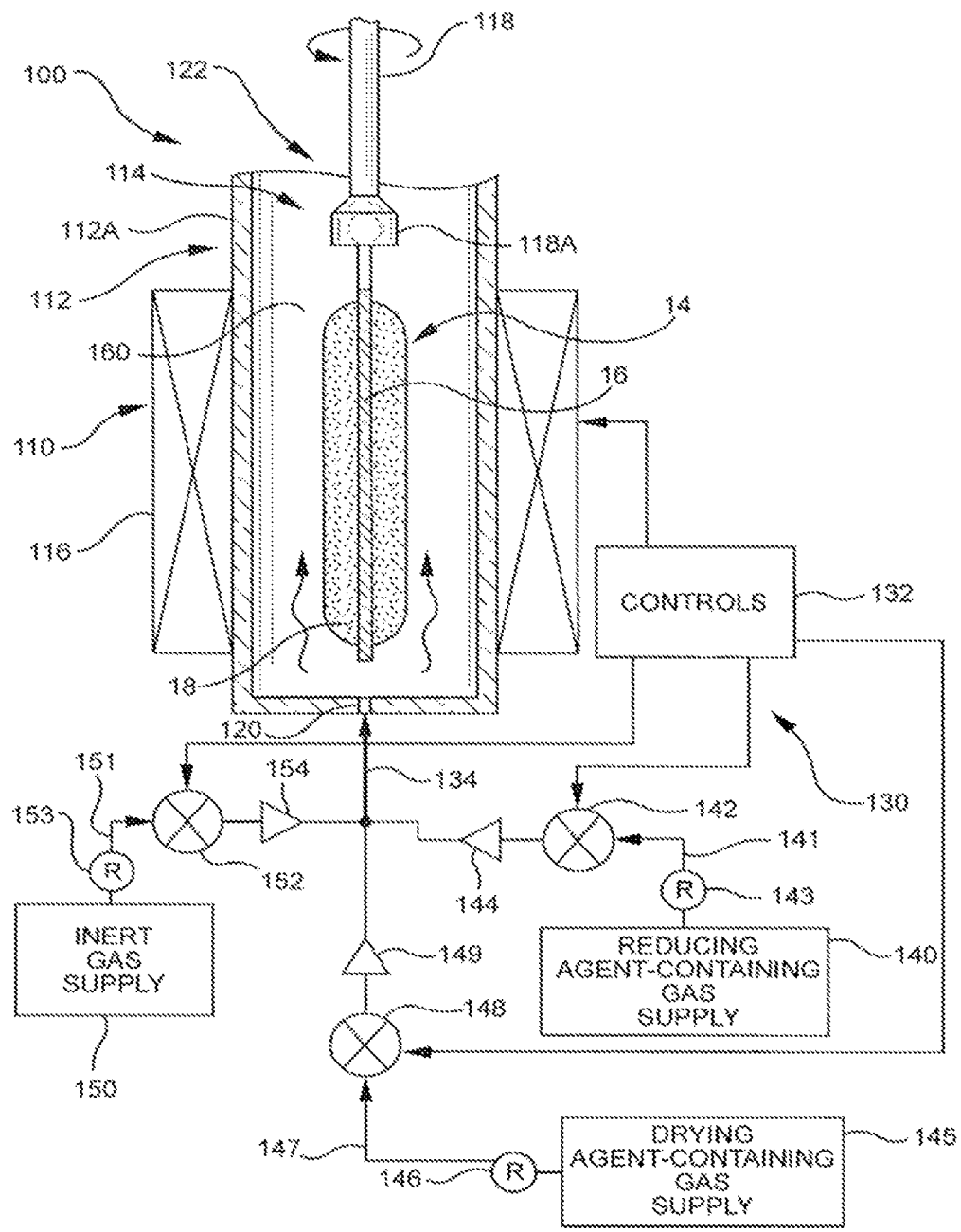
FIG. 8 is a schematic view of an optical fiber manufacturing apparatus used in the various steps of manufacturing optical fiber according to embodiments of this disclosure.

An exemplary apparatus for processing a cladding soot preform is depicted as apparatus 100 in FIG. 8. The cladding soot preform processing apparatus 100 is operable to consolidate the soot cladding 18, treat the soot cladding 18 with a reducing agent, and otherwise process (e.g., dry and/or dope) the soot cladding 18 as described herein to form a consolidated glass preform 20 as shown in FIG. 9. The consolidated glass preform 20 includes a consolidated glass core portion 10 and a consolidated cladding portion 12a, 12b. Apparatus 100 includes a furnace 110 and a fluid control system 130. The furnace 110 includes a vessel 112. The vessel 112 includes an annular muffle 112A. The vessel 112 defines a chamber 114 that has an inlet 120 and an outlet 122, each in fluid communication with the chamber 114. The vessel 112 may be formed of pure quartz. According to some embodiments, substantially all of the portions or surfaces of the vessel 112 that interface with the chamber 114 are formed of quartz. A quartz handle 118 extends into the chamber 114. The handle 118 has a coupling portion 118A from which the fiber preform 14 is removably suspended. A motor (not shown) may be provided to rotate the handle 118 and the attached overclad preform 14.

A heating device 116 partially or fully surrounds a portion of the muffle 112A. The heating device 116 may be, for example, a resistive or inductive heater or any other suitable heating device. The heating device 116 should provide sufficient heat to accomplish the process steps as described herein, including the pre-heat step and sintering step.

The fluid control system 130 includes suitable controls 132 that may be automatically, manually or semi-automatically operated. The system 130 further includes a supply 140 of reducing agent-containing gas, a supply 145 of a drying agent-containing gas, in some embodiments shown herein 145 comprises a chlorine-containing gas, and a supply 150 of a carrier or inert gas. The supplies 140, 145, 150 are pressurized and have respective pressure regulators 143, 146 and 153. Conduits or lines 141, 147, and 151 connect the supplies 140, 145, 150 to a common inlet line 134 that fluidly communicates with the inlet 120 to introduce a reducing agent-containing gas, drying agent-containing gas and/or carrier or inert gas into chamber 114 to interact with preform 14. A controllable on/off valve 142 and a check valve 144 are provided in the line 141. Similarly, controllable on/off valves 148, 152 and check valves 149, 154 are provided in the lines 147, 151. The controls 132 are operable to open and close the valves 142, 148 and 152.

The reducing agent-containing gas, drying agent-containing gas and/or carrier or inert gas may be introduced individually or in combination into chamber 114. Chamber 114 may be purged with the carrier or inert gas when switching between the reducing agent-containing gas and drying agent-containing gas. Although not explicitly shown in FIG. 8, consolidation apparatus 100 may also include a source of dopant precursor, such as a chlorine dopant precursor, that may be introduced into chamber 114 to effect doping of the soot cladding portion of preform 14.

Treatment of soot cladding preform 14 with a reducing agent or reducing agent-containing gas, a drying agent or drying agent-containing gas, or dopant precursor may be repeated in one or more treatment cycles. The one or more treatment cycles may be performed in the same apparatus 100 and the overclad preform 14 may be retained in the chamber 114 between each of the treatment cycles. One or more of the parameters of the treatment step may be modified. For example, the pressure; the temperature; composition(s) of the reducing agent-containing gas, drying agent-containing gas, and/or dopant precursor; the relative proportion of inert gas; and/or the treatment time may be different in different treatment cycles. A flow of the inert gas from the supply 150 or other suitable gas may be passed through the vessel 112 to purge the chamber 114 between each treatment cycle (if multiple cycles are used) and/or at the end of the reacting time of the last treatment cycle.

The soot cladding 18 may be doped by flowing a dopant gas (alone or with inert gas from the inert gas supply 150) through the chamber 114 and about the soot cladding preform 14 prior to the sintering step. The dopant gas may be any suitable gas such as $CF_4$, $SiF_4$, $C_2F_6$ and/or $SF_6$, $SiCl_4$, $Cl_2$, for example. The doping step(s) may be performed before, during (e.g. between treatment cycles with the reducing agent) and/or after the treatment of the soot cladding preform 14 with the reducing agent.

At block 50 of FIG. 6, an optical fiber is drawn from the reducing agent-treated, consolidated preform 20 (FIG. 9) using an optical fiber drawing apparatus. Suitable techniques and apparatus for drawing optical fiber from a consolidated glass preform are known to those of skill in the art. It will be appreciated that the consolidated glass preform core 10 of the consolidated preform 20 will form the core 10 (or a portion of the core 10) of the optical fiber and the consolidated cladding layers 12a, 12b of the consolidated preform 20 will form the cladding portion of the optical fiber, with the inner cladding, if any, being 12a and the over cladding being 12b as shown in FIG. 2A or 2B.

At block 52 of FIG. 6, the drawn fiber is placed in a deuterium treatment apparatus for treatment with deuterium gas. Suitable apparatus for performing deuterium treatment are known to those of skill in the art. According to some embodiments, the deuterium treatment apparatus includes a chamber for holding the drawn optical fiber, a supply of a deuterium-containing gas, and controls for supplying the deuterium-containing gas to the chamber. The apparatus is adapted to expose the drawn optical fiber placed in the chamber to a selected concentration of deuterium for a selected time at a selected temperature.

The deuterium treatment of the drawn fiber provides a reduction in the concentration of non-bridging oxygen defects in the core of the optical fiber, thereby reducing the sensitivity of the core to environmental hydrogen. Deuterium treatment of fiber is discussed, for example, in U.S. Pat. Nos. 6,499,318, 4,623,373, 4,515,612 and 4,685,945.

According to some embodiments, the reducing agent treatment of the cladding soot reduces the deuterium treatment time required to reduce the hydrogen sensitivity of the optical fiber to a targeted level by at least 20% as compared to the required deuterium treatment time for the same optical fiber formed without the reducing agent treatment, but otherwise formed in the same manner. In other embodiments, the required deuterium treatment time is reduced by at least 40% when CO is used as the reducing agent in combination with a step of drying with a low level of chlorine as described in the immediately preceding paragraph.

Methods and apparatus in accordance with embodiments of the present invention may provide advantages and benefits in the manufacture of optical fiber. As discussed above, non-bridging oxygen defects in the core of the drawn optical fiber may bond with environmental hydrogen to form absorption sites in the core, thereby increasing attenuation at wavelengths of concern (e.g. in the telecommunications window). The hydrogen sensitivity of the core can be reduced by deuterium treating the drawn fiber or the consolidated glass preform. However, during the deuterium treatment step, the deuterium of the deuterium-containing gas must diffuse through the cladding portion before diffusing into the core. Non-bridging oxygen defects in the cladding portion tend to consume the deuterium as it diffuses through the cladding portion. Thus, non-bridging oxygen defects in the cladding portion increase the treatment time required to treat the fiber with deuterium. Also, because the deuterium treatment process is limited by the rate of diffusion of the deuterium, the time required to complete the deuterium treatment process is extended. As a result, the rate of the production of the optical fiber may be substantially slowed.

In the methods of the present invention, the reducing agent of the treatment gas removes excess oxygen from the cladding soot 12a,12b so that the removed oxygen is not present following sintering to present non-bridging oxygen defects in the glass cladding 12a,12b of the drawn fiber. As a result, the defect concentration levels in the cladding are reduced. The obviated non-bridging oxygen defects are not present to consume deuterium during the deuterium treatment of the optical fiber core 10, thereby improving the rate and efficiency of the process and providing shorter deuterium treatment times.

The methods of the present disclosure are particularly important for embodiments where there is more than 500 ppm by weight Cl in the overclad, or greater than 2000 ppm by weight Cl in the overclad, or greater than 4000 ppm by weight Cl in the overclad, or greater than 6000 ppm by weight Cl in the overclad. As is shown in FIG. 5, the Time-to-Peak of the fiber increased with increasing Cl concentration in the overclad. This indicates that the concentration of oxygen-rich defects increases with increasing Cl concentration in the overclad. FIG. 5 also shows that treatment of the cladding soot with a reducing agent as disclosed herein reduced the Time-to-Peak of the fiber, which indicates that treatment with a reducing agent reduces the concentration of oxygen-rich defects in the overclad. A reduced concentration of oxygen-rich defects in the overclad means that manufacturing efficiency is improved because shorter deuterium treatment times are required to achieve a given reduction in the hydrogen sensitivity of the optical fiber. Fibers drawn from preforms that were consolidated in the presence of a reducing agent as described herein have a lower concentration of oxygen-rich defects and require shorter deuterium treatment times to achieve a given hydrogen sensitivity (as measured by TTP) than fibers drawn from preforms that were not consolidated in the presence of a reducing agent.

While the optical fibers, methods and apparatus of the present invention are described above with reference to a step index optical fiber having a reducing agent-treated cladding, the methods and apparatus may be used to form other types of optical fiber as well. For example, the methods and apparatus may be used to form pure silica core step index optical fibers, graded index optical fibers, W-profile optical fibers, pedestal profile optical fibers, or optical fibers having more complicated multi-segment profiles (e.g. including at least a central core, a moat, a ring, and a cladding). The optical fibers may have multiple cladding layers. The cladding layers may be differentially treated with a reducing agent (e.g. one cladding layer may be treated with a reducing agent and another cladding layer may not be treated with a reducing agent). Segments of the physical core other than the central core may be treated with the reducing agent as described above with regard to the reducing agent treatment of the core soot preform. Preferably, such additional core segments are treated with a reducing agent in accordance with the parameters (for example, with regard to increases in baseline attenuation) as discussed above with regard to the core.

Within the scope of the present disclosure is an optical fiber comprising a core and at least one cladding layer, the at least one cladding layer including a chlorine dopant concentration of at least 500 ppm by weight, the optical fiber containing less than 1 ppb by weight of OD groups and having a time-to-peak (TTP) hydrogen aging value at 23° C. of less than 100 hours upon exposure to a gas atmosphere having a total pressure of 1 atm and containing a partial pressure of 0.01 atm $H_2$ and a partial pressure of 0.99 atm $N_2$.

EXAMPLE

Three 125 μm diameter SMF fibers were manufactured by forming and drawing each fiber from a respective glass preform. Each preform was formed by forming a core cane, thereafter forming cladding soot on the core cane, and thereafter consolidating the cladding soot. The consolidation of the cladding soot included: a first phase, which was an isothermal phase in which the cladding soot was exposed to a first processing gas for about 240 minutes at a temperature of about 1150° C. to dry the cladding soot; and 2) a second phase, in which the cladding soot was exposed to a second processing gas for about 6 hours at a temperature of about 1150-1500° C. Sintering of the cladding soot was expected in the second phase. The three fibers were manufactured in substantially the same manner except that the processing gases for the first and second phases of each of the three preforms contained different concentrations of $Cl_2$ and CO (with the remaining gas comprising helium) as indicated in Table 1:

TABLE 1

| Preform # | First phase $Cl_2$ concentration (volume %) | Second phase $Cl_2$ concentration (volume %) | Second phase CO concentration (volume %) |
|---|---|---|---|
| 1 | 4.3 | 4.3 | 0 |
| 2 | 1.4 | 1.4 | 0 |
| 3 | 1.4 | 1.4 | 0.5 |
| 4 | 1.4 | 0 | 0.5 |

Each of the three fibers was exposed to a hydrogen-containing gas at 1 atm total pressure that included a partial pressure of $H_2$ of 0.01 atm and a partial pressure of $N_2$ of 0.99 atm at 23° C. The time for the hydrogen to diffuse through the fiber cladding to the fiber core (also referred to as time-to-peak (TTP)) under these conditions was measured for each fiber. TTP was measured on the basis of attenuation of an optical signal having a wavelength of 1383 nm and corresponded to the time following exposure of the fiber to the hydrogen-containing gas at which a steep increase in attenuation was observed (analogous to the method depicted in FIG. 1 at 1383 nm). The fiber drawn from Preform #1 had an average 1383 nm TTP of approximately 105 hours. The fiber drawn from Preform #2 had an average 1383 nm TTP of about 76 hours. The fiber drawn from Preform #3 had an average 1383 nm TTP of about 58 hours. The fiber drawn from Preform #4 had an average 1383 nm TTP of about 40 hours. Deuterium treatment times are generally proportional to TTP; that is, lower TTP corresponds to lower (shorter) deuterium treatment times.

The foregoing is illustrative of the present invention and is not to be construed as limiting thereof. Although a few exemplary embodiments of this invention have been described, those skilled in the art will readily appreciate that many modifications are possible in the exemplary embodiments without materially departing from the novel teachings and advantages of this invention. Accordingly, all such modifications are intended to be included within the scope of this invention. Therefore, it is to be understood that the foregoing is illustrative of the present invention and is not to be construed as limited to the specific embodiments disclosed, and that modifications to the disclosed embodiments, as well as other embodiments, are intended to be included within the scope of the invention.

We claim:

1. A method of producing an optical fiber comprising:
   providing a preform having a consolidated glass core and a first porous glass cladding layer;
   exposing the preform to a first gas atmosphere at a first temperature, the first gas atmosphere comprising a chlorine source material, the chlorine source material providing chlorine for doping the first porous glass cladding layer;
   exposing the preform to a second gas atmosphere at a second temperature; the second gas atmosphere comprising a reducing agent, the second gas atmosphere not containing chlorine; and
   heating the preform in the presence of the second gas atmosphere at a third temperature; the heating causing sintering of the first porous glass cladding layer, the sintered first porous glass cladding layer having a chlorine dopant concentration of at least 500 ppm by weight.

2. The method of claim 1, wherein the first temperature is at least 800° C., the second temperature is greater than or equal to the first temperature, and the third temperature is greater than or equal to the second temperature.

3. The method of claim 2, wherein the first temperature is at least 1050° C. and the third temperature is at least 1300° C.

4. The method of claim 1, wherein the chlorine source material is $Cl_2$, $SiCl_4$, or $CCl_4$ and wherein the reducing agent is CO, $CH_3Cl$, $CH_2Cl_2$, or $CHCl_3$.

5. The method of claim 1, wherein the chlorine source material comprises $Cl_2$ and the reducing agent comprises CO.

6. The method of claim 1, further comprising drawing a fiber from the preform with sintered first porous glass cladding layer.

7. A method of producing an optical fiber comprising:
   providing a preform having a consolidated glass core and a first porous glass cladding layer;
   exposing the preform to a first gas atmosphere at a first temperature, the first gas atmosphere comprising a chlorine source material, the chlorine source material providing chlorine for doping the first porous glass cladding layer;
   exposing the preform to a second gas atmosphere at a second temperature; the second gas atmosphere comprising a reducing agent; and
   heating the preform in the presence of the second gas atmosphere at a third temperature; the heating causing sintering of the first porous glass cladding layer, the sintered first porous glass cladding layer having a chlorine dopant concentration of at least 500 ppm by weight;
   wherein the reducing agent is CO and the concentration of CO in the second gas atmosphere is greater than 1000 ppm by volume.

8. The method of claim 7, wherein the concentration of CO in the second gas atmosphere is greater than 5000 ppm by volume.

9. The method of claim 7, wherein the first temperature is at least 800° C., the second temperature is greater than or equal to the first temperature, and the third temperature is greater than or equal to the second temperature.

10. The method of claim 9, wherein the first temperature is at least 1050° C. and the third temperature is at least 1300° C.

11. The method of claim 7, wherein the chlorine source material is $Cl_2$, $SiCl_4$, or $CCl_4$.

12. The method of claim 7, wherein the chlorine source material is $Cl_2$.

13. The method of claim 7, further comprising drawing a fiber from the preform with sintered first porous glass cladding layer.

14. A method of producing an optical fiber comprising:
    providing a preform having a consolidated glass core and a first porous glass cladding layer;
    exposing the preform to a first gas atmosphere at a first temperature, the first gas atmosphere comprising a chlorine source material, the chlorine source material providing chlorine for doping the first porous glass cladding layer;
    exposing the preform to a second gas atmosphere at a second temperature; the second gas atmosphere comprising a reducing agent; and
    heating the preform in the presence of the second gas atmosphere at a third temperature; the heating causing sintering of the first porous glass cladding layer, the sintered first porous glass cladding layer having a chlorine dopant concentration of at least 500 ppm by weight;
    wherein the second gas atmosphere comprises the first gas atmosphere and
       wherein the volumetric ratio of the reducing agent to the chlorine source material in the second gas atmosphere is greater than 0.005.

15. The method of claim 14, wherein the volumetric ratio of the reducing agent to the chlorine source material in the second gas atmosphere is greater than 0.020.

16. The method of claim 14, wherein the first temperature is at least 800° C., the second temperature is greater than or equal to the first temperature, and the third temperature is greater than or equal to the second temperature.

17. The method of claim 16, wherein the first temperature is at least 1050° C. and the third temperature is at least 1300° C.

18. The method of claim 14, wherein the chlorine source material is $Cl_2$, $SiCl_4$, or $CCl_4$ and wherein the reducing agent is CO, $CH_3Cl$, $CH_2Cl_2$, or $CHCl_3$.

19. The method of claim 14, wherein the chlorine source material comprises $Cl_2$ and the reducing agent comprises CO.

20. The method of claim 14, further comprising drawing a fiber from the preform with sintered first porous glass cladding layer.

21. A method of producing an optical fiber comprising:
    providing a preform having a consolidated glass core and a first porous glass cladding layer;
    exposing the preform to a first gas atmosphere at a first temperature, the first gas atmosphere comprising a chlorine source material, the chlorine source material providing chlorine for doping the first porous glass cladding layer;
    exposing the preform to a second gas atmosphere at a second temperature; the second gas atmosphere comprising a reducing agent; and
    heating the preform in the presence of the second gas atmosphere at a third temperature; the heating causing sintering of the first porous glass cladding layer, the sintered first porous glass cladding layer having a chlorine dopant concentration of at least 500 ppm by weight;

wherein the reducing agent is CO and the ratio of the concentration of CO in the second gas atmosphere in units of ppm by volume to the chlorine dopant concentration in the sintered first porous glass cladding layer in units of ppm by weight is greater than 0.5.

22. The method of claim 21, wherein the ratio of the concentration of CO in the second gas atmosphere in units of ppm by volume to the chlorine dopant concentration in the sintered first porous glass cladding layer in units of ppm by weight is greater than 2.0.

23. The method of claim 21, wherein the first temperature is at least 800° C., the second temperature is greater than or equal to the first temperature, and the third temperature is greater than or equal to the second temperature.

24. The method of claim 23, wherein the first temperature is at least 1050° C. and the third temperature is at least 1300° C.

25. The method of claim 21, wherein the chlorine source material is $Cl_2$, $SiCl_4$, or $CCl_4$ and wherein the reducing agent is CO, $CH_3Cl$, $CH_2Cl_2$, or $CHCl_3$.

26. The method of claim 21, wherein the chlorine source material comprises $Cl_2$ and the reducing agent comprises CO.

27. The method of claim 21, further comprising drawing a fiber from the preform with sintered first porous glass cladding layer.

28. A method of producing an optical fiber comprising:
providing a preform having a consolidated glass core and a first porous glass cladding layer;
exposing the preform to a first gas atmosphere at a first temperature, the first gas atmosphere comprising a chlorine source material, the chlorine source material providing chlorine for doping the first porous glass cladding layer;
exposing the preform to a second gas atmosphere at a second temperature; the second gas atmosphere comprising a reducing agent; and
heating the preform in the presence of the second gas atmosphere at a third temperature; the of the first glass cladding layer, the sintered first porous glass cladding layer having a chlorine dopant concentration of at least 500 ppm by weight;
wherein the chlorine dopant concentration in the sintered first porous glass cladding layer is greater than 2000 ppm by weight.

29. The method of claim 28, wherein the first temperature is at least 800° C., the second temperature is greater than or equal to the first temperature, and the third temperature is greater than or equal to the second temperature.

30. The method of claim 29, wherein the first temperature is at least 1050° C. and the third temperature is at least 1300° C.

31. The method of claim 28, wherein the chlorine source material is $Cl_2$, $SiCl_4$, or $CCl_4$ and wherein the reducing agent is CO, $CH_3Cl$, $CH_2Cl_2$, or $CHCl_3$.

32. The method of claim 28, wherein the chlorine source material comprises $Cl_2$ and the reducing agent comprises CO.

33. The method of claim 28, further comprising drawing a fiber from the preform with sintered first porous glass cladding layer.

34. A method of producing an optical fiber comprising:
providing a preform having a consolidated glass core and a first porous glass cladding layer;
exposing the preform to a first gas atmosphere at a first temperature, the first gas atmosphere comprising a chlorine source material, the chlorine source material providing chlorine for doping the first porous glass cladding layer;
exposing the preform to a second gas atmosphere at a second temperature; the second gas atmosphere comprising a reducing agent; and
heating the preform in the presence of the second gas atmosphere at a third temperature; the heating causing sintering of the first porous glass cladding layer, the sintered first porous glass cladding layer having a chlorine dopant concentration of at least 500 ppm by weight;
wherein the preform further comprises a second porous glass cladding layer, the second porous glass cladding layer surrounding the first porous glass cladding layer.

35. The method of claim 34, wherein
the chlorine source material further provides chlorine for doping the second porous glass cladding layer and the heating at the third temperature causes sintering of the second porous glass cladding layer, the chlorine dopant concentration of the sintered first porous glass cladding layer being at least 1000 ppm by weight and the sintered second porous glass cladding layer having a chlorine dopant concentration less than said chlorine dopant concentration of the sintered first porous glass cladding layer.

36. The method of claim 34, wherein the first temperature is at least 800° C., the second temperature is greater than or equal to the first temperature, and the third temperature is greater than or equal to the second temperature.

37. The method of claim 36, wherein the first temperature is at least 1050° C. and the third temperature is at least 1300° C.

38. The method of claim 34, wherein the chlorine source material is $Cl_2$, $SiCl_4$, or $CCl_4$ and wherein the reducing agent is CO, $CH_3Cl$, $CH_2Cl_2$, or $CHCl_3$.

39. The method of claim 34, wherein the chlorine source material comprises $Cl_2$ and the reducing agent comprises CO.

40. The method of claim 34, further comprising drawing a fiber from the preform with sintered first porous glass cladding layer.

* * * * *

UNITED STATES PATENT AND TRADEMARK OFFICE
CERTIFICATE OF CORRECTION

| | | |
|---|---|---|
| PATENT NO. | : 9,650,281 B2 | Page 1 of 1 |
| APPLICATION NO. | : 14/734104 | |
| DATED | : May 16, 2017 | |
| INVENTOR(S) | : Dana Craig Bookbinder et al. | |

It is certified that error appears in the above-identified patent and that said Letters Patent is hereby corrected as shown below:

On the Title Page

In Column 2, in Item (57) "Abstract", Line 4, delete "in the in the" and insert -- in the --.

In the Claims

In Column 23, Line 44, in Claim 28, delete "the of the first" and insert -- the heating causing sintering of the first porous --.

Signed and Sealed this
Fourth Day of February, 2025

Coke Morgan Stewart
*Acting Director of the United States Patent and Trademark Office*